United States Patent
Vaidya

(10) Patent No.: US 8,091,434 B2
(45) Date of Patent: Jan. 10, 2012

(54) FLUIDIC OSCILLATOR FLOW METER

(76) Inventor: Avinash Shrikrishna Vaidya, Maharashtra (IN)

( * ) Notice: Subject to any disclaimer, the term of this patent is extended or adjusted under 35 U.S.C. 154(b) by 0 days.

(21) Appl. No.: 12/997,098

(22) PCT Filed: Apr. 29, 2009

(86) PCT No.: PCT/IN2009/000258
§ 371 (c)(1),
(2), (4) Date: Dec. 9, 2010

(87) PCT Pub. No.: WO2009/150663
PCT Pub. Date: Dec. 17, 2009

(65) Prior Publication Data
US 2011/0094308 A1    Apr. 28, 2011

(30) Foreign Application Priority Data
Jun. 10, 2008  (IN) .......................... 1231/MUM/2008

(51) Int. Cl.
*G01F 1/20* (2006.01)
(52) U.S. Cl. .................................... 73/861.19
(58) Field of Classification Search ............... 73/861.22, 73/861.19, 861.63, 202
See application file for complete search history.

(56) References Cited

U.S. PATENT DOCUMENTS

| | | | |
|---|---|---|---|
| 3,902,367 A | 9/1975 | Grant et al. | |
| 4,838,091 A | 6/1989 | Markland et al. | |
| 4,930,357 A * | 6/1990 | Thurston et al. | 73/861.19 |
| 5,127,173 A * | 7/1992 | Thurston et al. | 73/202 |
| 5,922,970 A * | 7/1999 | Ohle | 73/861.22 |
| 6,351,999 B1 * | 3/2002 | Maul et al. | 73/861.22 |
| 7,383,740 B2 | 6/2008 | Krasilchikov et al. | |

FOREIGN PATENT DOCUMENTS

| | | |
|---|---|---|
| DE | 2051804 | 10/1970 |
| DE | 7733396 | 3/1978 |
| EP | 0381344 | 8/1990 |
| WO | 2006114592 | 11/2006 |
| WO | 2008110766 | 9/2008 |

\* cited by examiner

*Primary Examiner* — Jewel V Thompson
(74) *Attorney, Agent, or Firm* — Cowan, Liebowitz & Latman, P.C.; Mark Montague, Esq.

(57) ABSTRACT

The present invention discloses a feedback type, hydrodynamic oscillator flow meter for measuring the flow of fluids such as gas, air, water and oil, flowing through a conduit. This flow meter gives very accurate measurements over a long period of time since piezoelectric sensors are employed. The working principle of this flow meter is based on the Coanda Effect, which guides the flowing fluid to pass through two feedback paths (103, 129) alternatively and a linear relationship is obtained between the fluidic oscillation frequency and the flow rate.

8 Claims, 11 Drawing Sheets

Figure 1:
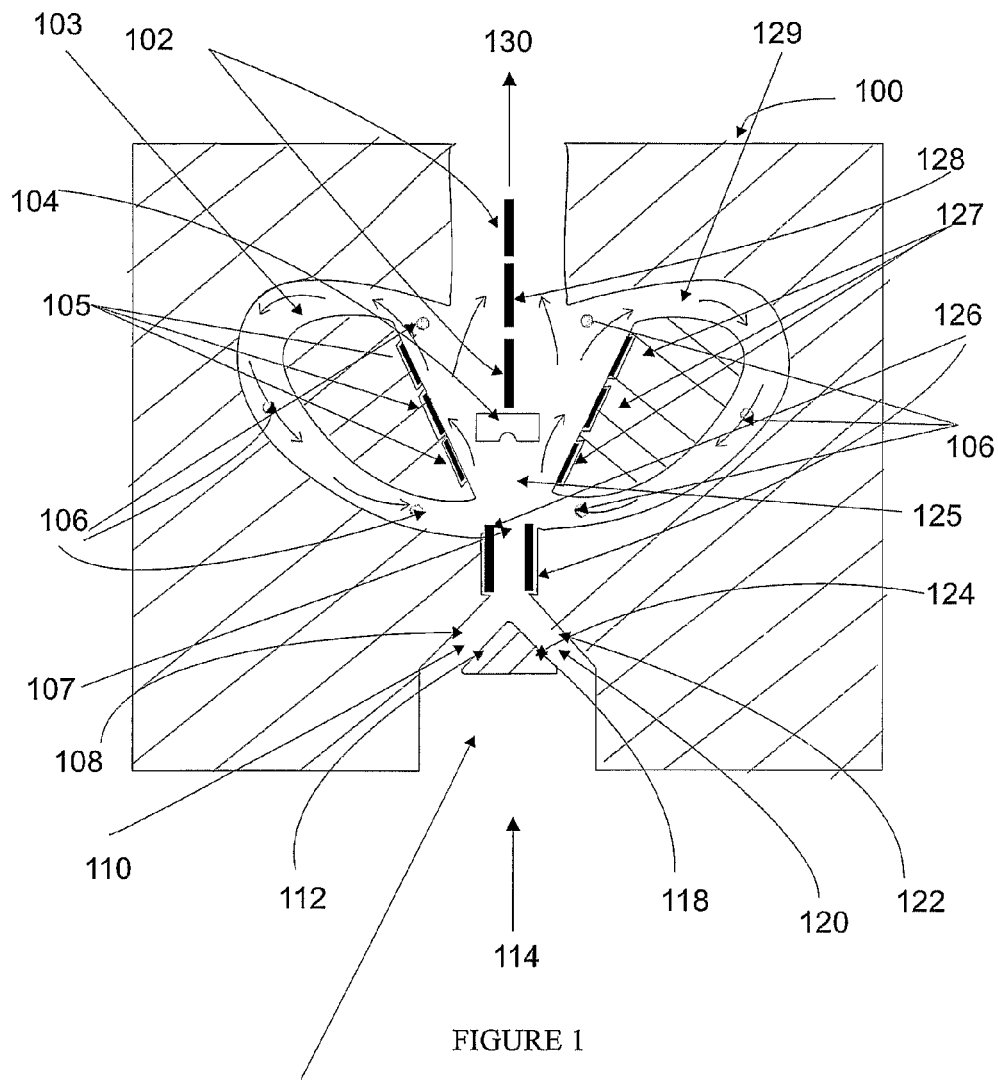

 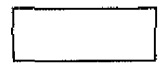 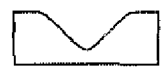
FIGURE 4A    FIGURE 4B    FIGURE 4C
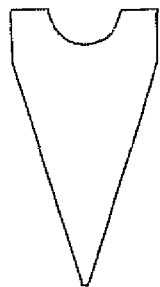 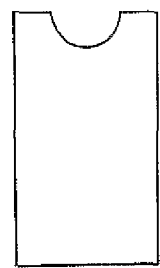 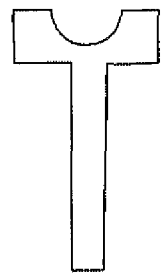
FIGURE 4D    FIGURE 4E    FIGURE 4F

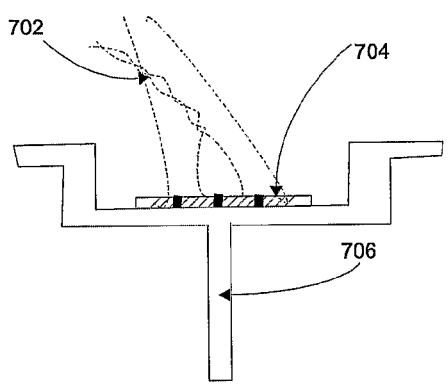
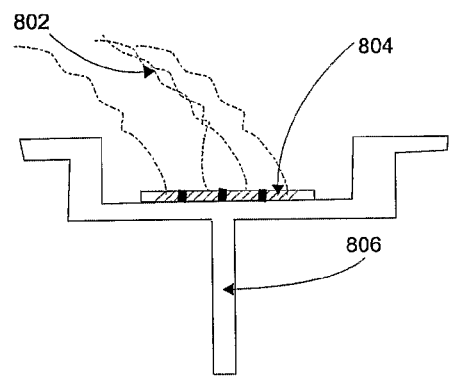
FIGURE 7A　　　　　　　FIGURE 8A
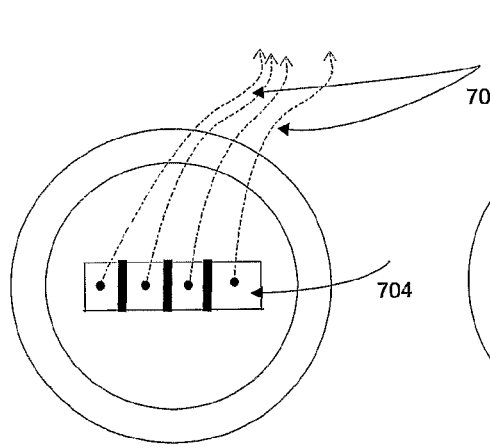
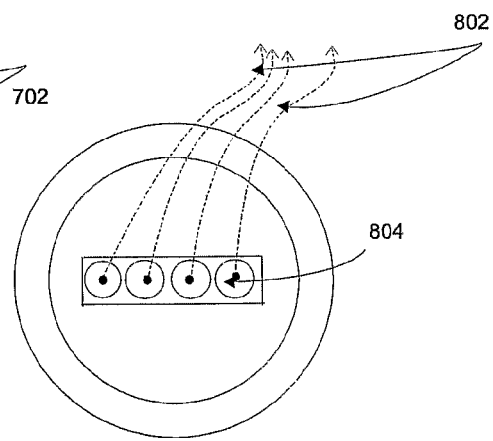
FIGURE 7B　　　　　　　FIGURE 8B

FLUIDIC OSCILLATOR FLOW METER

FIELD OF THE INVENTION

This invention relates to flow measuring devices.

DEFINITIONS

Various expressions used in this specification will have the meanings as assigned to them as given below.

The expression "flow profile" used in the specification means the map or the plot of point velocities of fluid flow at precise different points across a section of a conduit through which the fluid is flowing. The theoretical velocities at different locations can be easily obtained by one skilled in the art using different mathematical models such as Bernoulli's theorem, Reynolds's equation, Prandtl's law and the like. A fully developed flow profile means a flow profile where the velocity of flow at a predetermined point can be predicted.

In accordance with this specification, an arrangement of one or more elements by which a fully developed flow profile is obtained is called a "flow conditioner".

In accordance with this specification, the term 'nozzle' means an arrangement of one or more elements by which the cross section of a flow path is reduced.

The expression 'bluff body' means a body by which an obstruction is made in a flow path, the body being made of a variety of materials and shapes, geometric and non-geometric, and may include a partition in a flow path.

BACKGROUND OF THE INVENTION

Different types of flow measuring devices based on the principle of the fluidic oscillator are known. These fluidic-oscillator type flow meters generate oscillatory flow whose frequencies of oscillations are proportional to the flow of fluids. The known fluidic oscillator flow meters use sensors and sensing methods which are not very accurate and are affected by noise.

U.S. Pat. Nos. 3,902,367 and 4,838,091 disclose flow meters, wherein the flow rate is determined by measuring the oscillating variation of pressure using differential pressure sensors for measuring the frequency of oscillations. Hence, these flow meters are not very accurate.

U.S. Pat. No. 7,383,740 discloses a spirometer. The spirometer uses pressure and velocity sensors to detect the flow rate of the fluid. This results in inaccuracies and errors as pressure and velocity do not indicate exact flow rate.

PCT application WO2006114592 describes a flow meter provided with means to apply a magnetic field and having electrodes. This makes the flow meter complicated and also prone to errors.

PCT application 2008110766 describes a bi-directional flow meter. The measurement means typically used are inductive sensors, ultrasonic sensors or pressure sensors. The frequency of the output signal is proportional to the frequency of oscillations, which in turn is used to determine the flow rate of the fluid.

Following are the limitations of flow meters of the prior art:

When magnets are used for creating magnetic field for sensing oscillation frequency of fluid, the fluid must have certain electrical conductivity. Hence, the flow of oils and gases cannot be measured. If magnetic particles are present in the flowing fluid, the meter will immediately get clogged since the magnets used are very strong and the burr or magnetic material once attracted towards the magnet are impossible to be removed. In addition to that, the magnets are costly and the assembly of these flow meters is very difficult. Also, they have limited operating temperature range.

When temperature sensitive type sensors are used, these sensors are heated above the operating temperature of the fluid and the oscillatory flow is sensed by cooling and heating periodically. These sensors are very delicate and external power is required to heat up the sensor. To compensate for frequency response of the sensor to varying operating temperature and other fluid properties of the flowing fluid, it is necessary to have complicated electronic circuitry for proper and accurate sensing of fluid fluctuations. Thus these meters have a limited operating pressure and temperature range.

Flow meters based on differential pressure measurement are also used currently. Fluctuations in the differential pressure measured across the feedback path or main stream can be used to measure frequency of oscillatory flow. However, the sensing ports, tubes and the volume across the diaphragm of the sensor add to the hydraulic capacitance which actually increases the volume effectively and add to the delay in feedback sensing. Also, the actual signal is attenuated to a large extent. This type of sensor also needs external power for its operation. If the tubes and ports are kept very small to avoid these problems, then a very small particle in the flow can block the sensor ports. In the medical applications, where the sterility of the instrument is a very essential factor, this tubing and passages can pose serious threat since it is not possible for them to get cleaned thoroughly. Further, these flow meters also have limited operating pressure and temperature ranges.

Inductive sensors have also been used in flow meters. The inductive flow meters are very sensitive to noise and hence not very accurate. The arrangement of coils and movable core is similar to a probe commonly known as the L.V.D.T. probe. A set of coils is excited by an ac voltage signal and a movement of the core inside the coils generates an electrical signal in another set of coils. To sense the fluid's oscillatory frequency, the probe with sealing arrangement, having a diaphragm or oil filled bellows, is located in the flow meter. The diaphragm moves in response to the oscillating fluid pressure, wherein the core is connected to the diaphragm on the other side and thus the signal is sensed. These types of sensors perform poorly at low frequency and at high frequency due to mechanical inertia.

Therefore there is a need for a flow meter which is more accurate and insensitive to noise.

OBJECTS OF THE INVENTION

It is an object of the present invention to provide a device for measuring flow rate of all types of fluids such as gas, oil, water and air which is independent of the fluid properties.

Another object of this invention is to provide a flow meter which is accurate.

Still one more object of this invention is to provide a flow meter which is economical.

Yet another object of this invention is to provide a flow meter which is simple in construction.

SUMMARY OF THE INVENTION

In accordance with the preferred embodiment of the present invention, there is provided a feedback type, hydrodynamic oscillator flow meter for measuring the flow of fluids such as gas, air, water and oil, flowing through a conduit, said flow meter comprising:

a meter body having a passage for the flow of the fluid, said passage defining an inlet and an outlet;

a nozzle provided in the passage spaced apart from the inlet;

optionally at least one flow conditioner provided between the inlet of the passage and the inlet of the nozzle;

a bluff body placed in the passage spaced apart from the outlet of the nozzle;

at least one sensor assembly comprising a sensor body having at least two sensing segments, leads extending from said sensing segments to a metering device located outside said meter body and at least one sensor fin extending from said segments into said passage; and two feedback paths provided in the body, each of the feedback paths having a feedback inlet in the passage between the bluff body and the outlet of the passage and a feedback outlet located between the outlet of the nozzle and the bluff body, to permit feedback flow of the fluid, alternately through either of the feedback paths.

Typically, the sensing segments are selected from a group consisting of piezoelectric, piezoresistive, capacitive, optoelectric, strain/stress responsive, magnetostrictive and pressure sensitive sensing segments.

Typically, the sensing segments are round, disc shaped or in the form of rectangular strips.

In one embodiment of the invention, the bluff body is a sensor fin.

Typically, the sensor fins are selected from a group consisting of single fins, bifurcated fins, cylindrical fins, rectangular fins, tapered fins and a combination thereof.

Preferably, the sensor assembly is provided with noise cancellation means.

Typically a flow conditioner is provided with uniform machined irregularities or is molded with irregularities.

BRIEF DESCRIPTION OF THE ACCOMPANYING DRAWINGS

Figure 2:
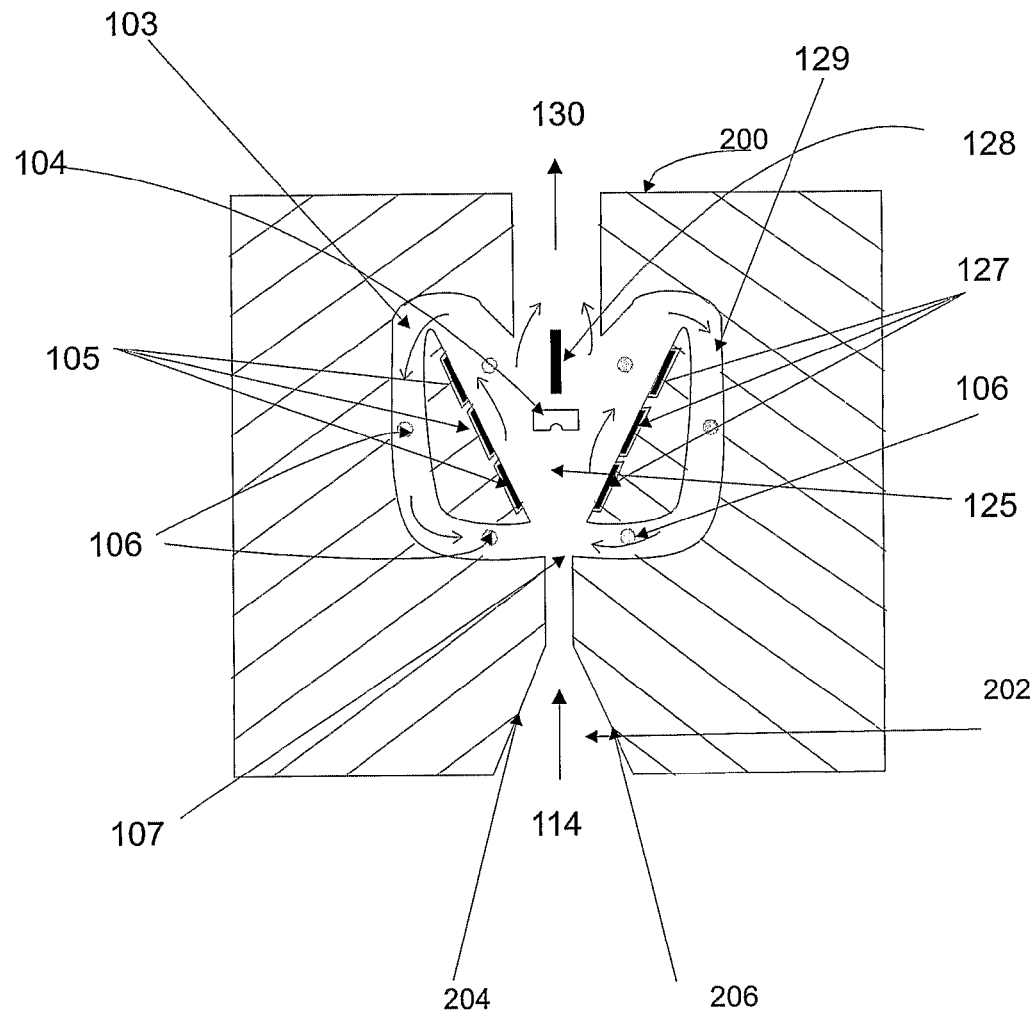
Figure 5A:
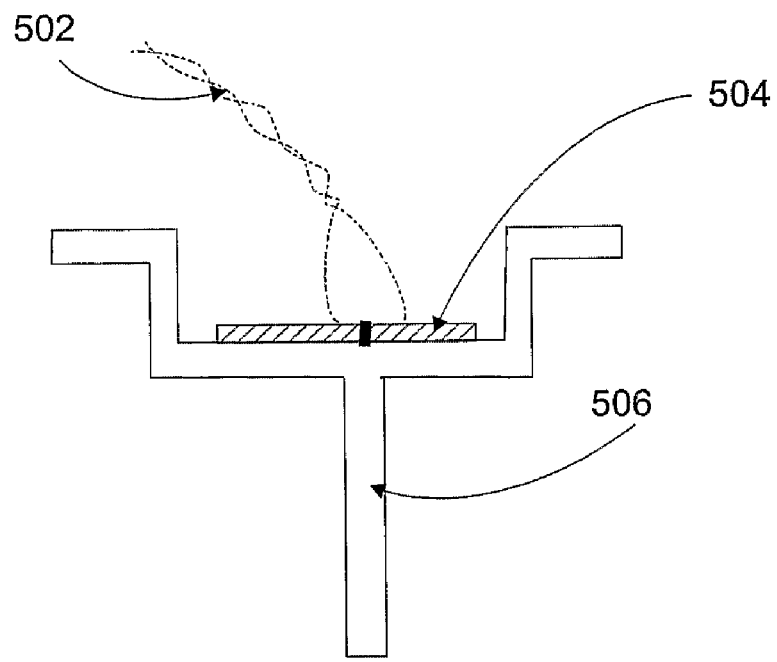
Figure 5B:
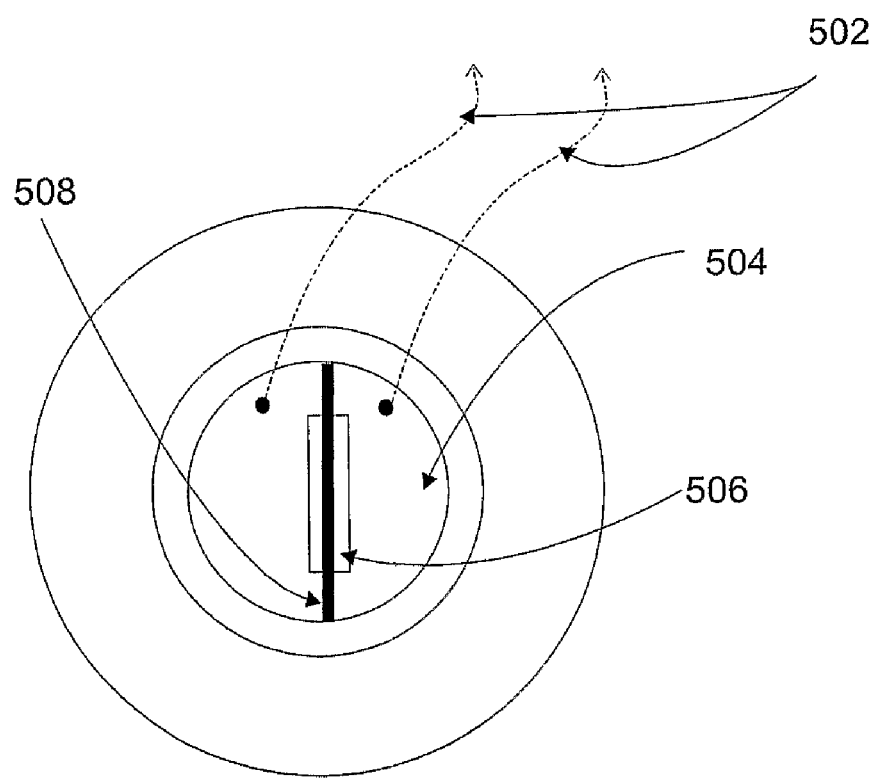
Figure 6A:
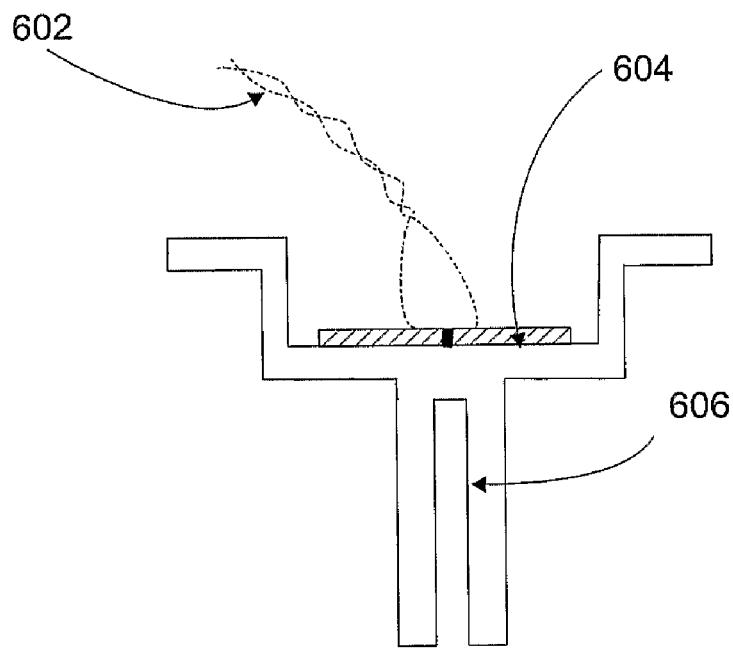
Figure 6B:
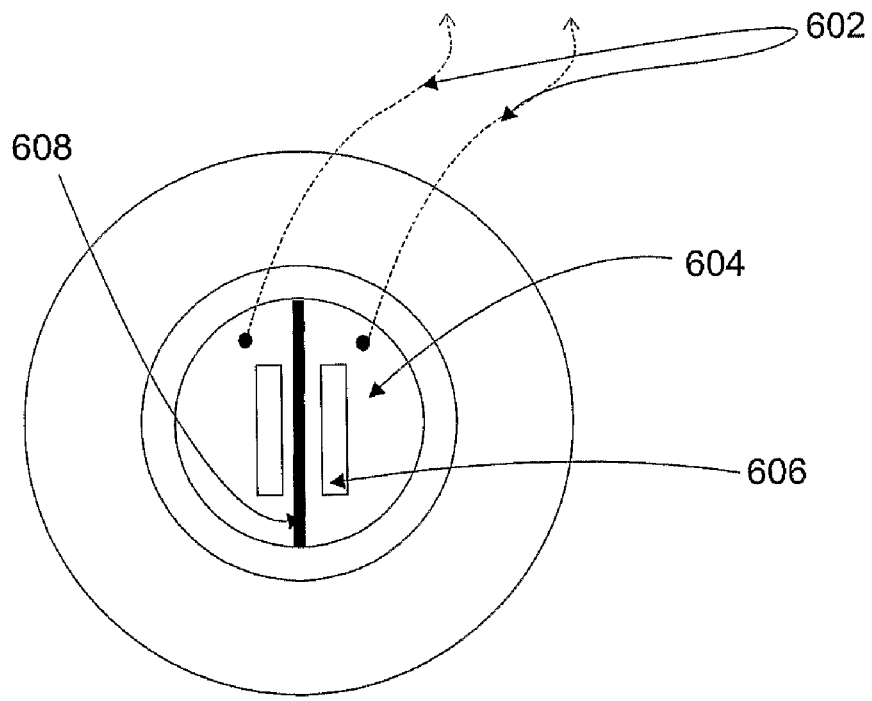
Figure 9:
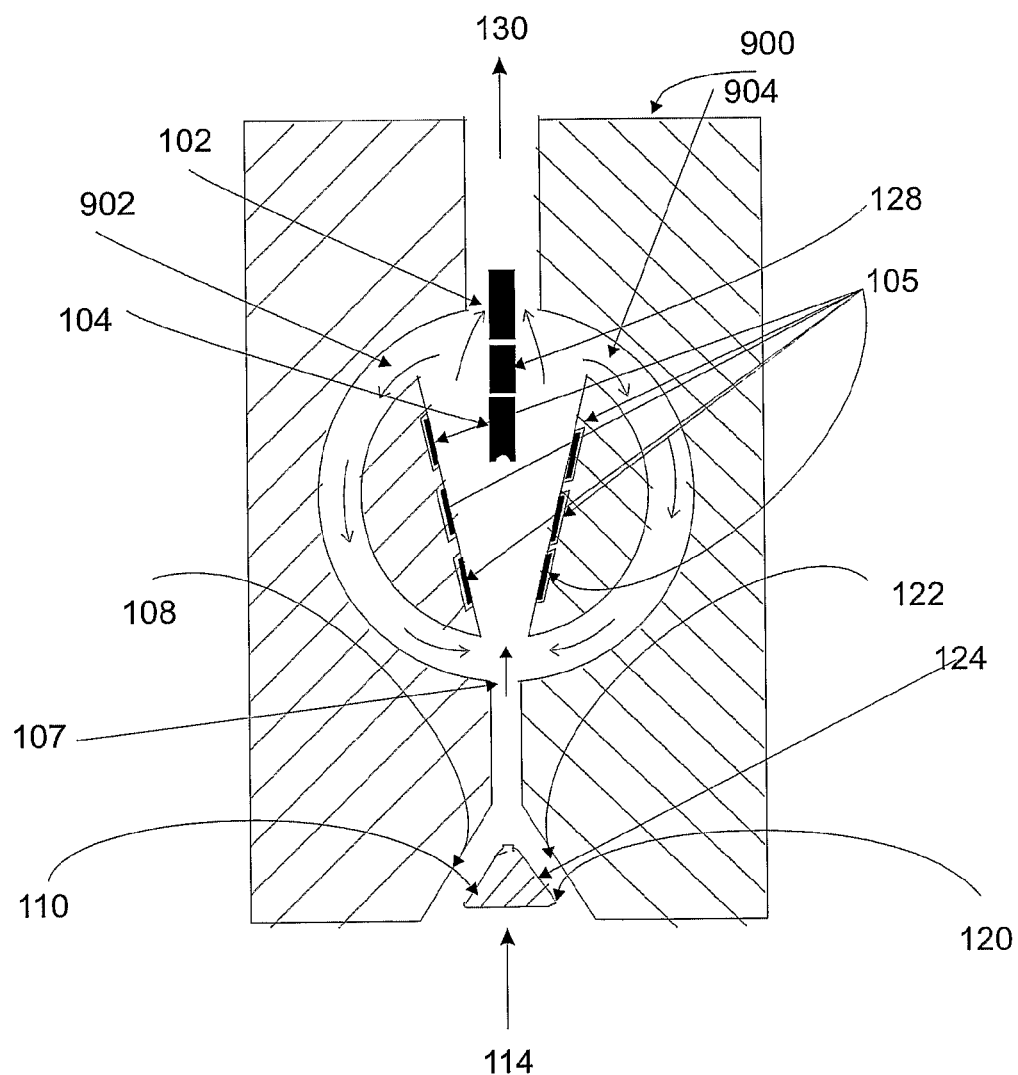
Figure 10A:
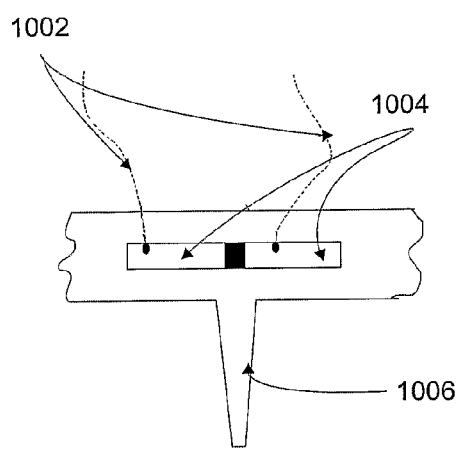
Figure 10B:
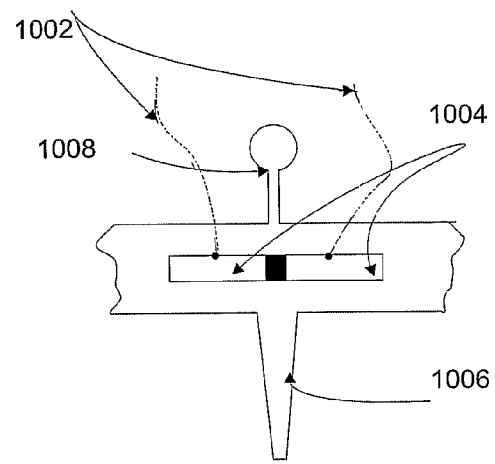
Figure 11:
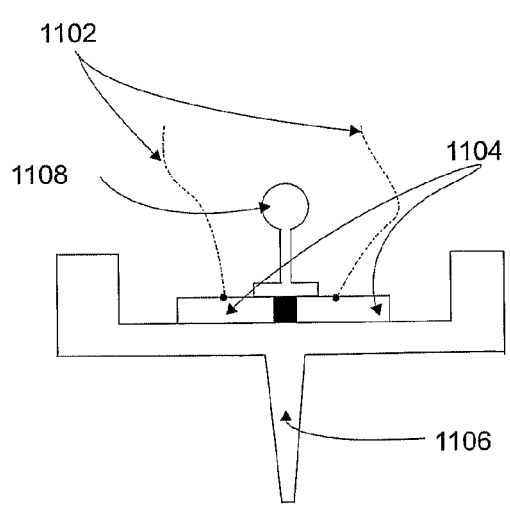
Figure 12:
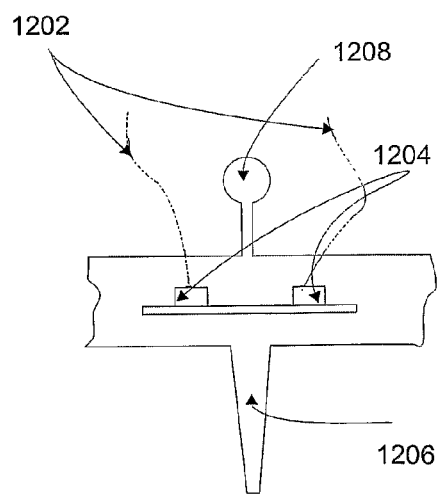
Figure 13:
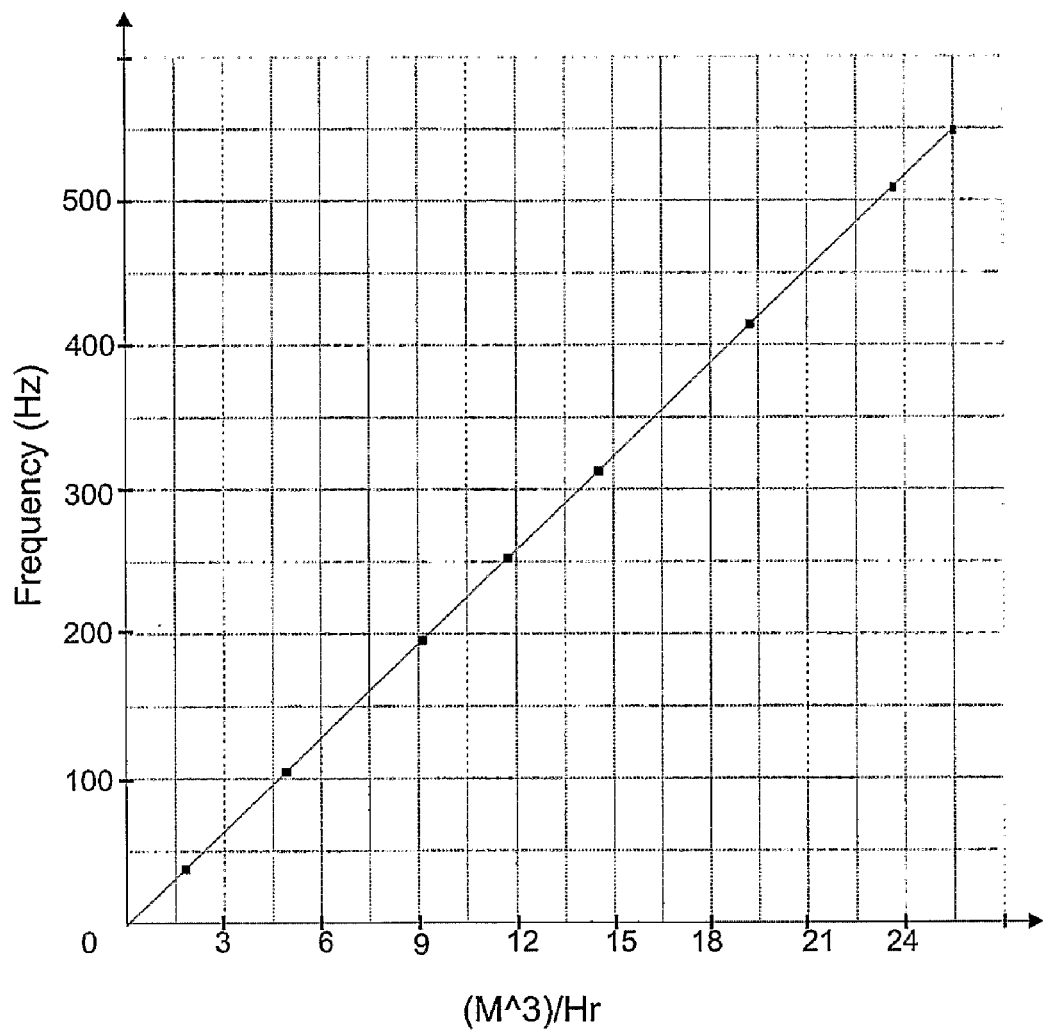
Figure 14:
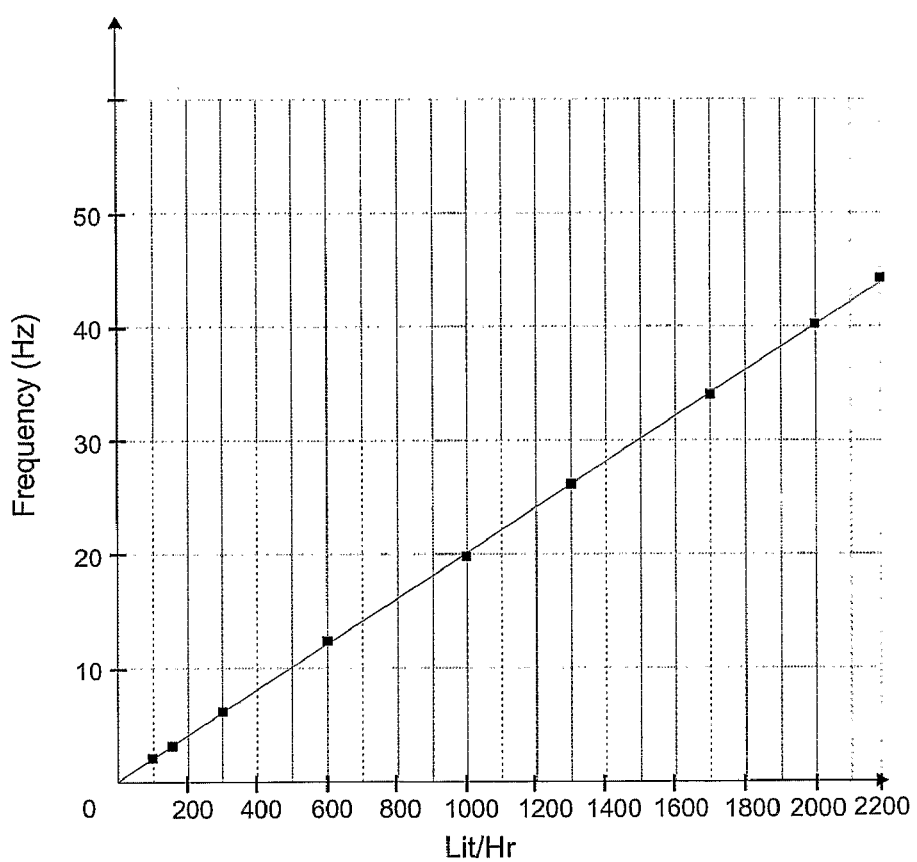

The invention will now be described with the help of the accompanying drawings, in which:

FIG. 1 of the accompanying drawings illustrates a flow meter in accordance with one embodiment this invention;

FIG. 2 of the accompanying drawings illustrates a flow meter in accordance with another embodiment this invention;

FIG. 3a-3d of the accompanying drawings illustrate different embodiments of the flow conditioner according to the present invention;

FIG. 4a-4f of the accompanying drawings illustrate different embodiments of the bluff body in accordance with this invention;

FIG. 5a of the accompanying drawings illustrates the side view of one embodiment of a sensor assembly for the flow meters shown in FIGS. 1 to 2;

FIG. 5b of the accompanying drawings illustrates the top view of one embodiment of a sensor assembly shown in FIG. 5a;

FIG. 6a of the accompanying drawings illustrates the side view of the sensor assembly with a bifurcated fin for the flow meters shown in FIGS. 1 to 2;

FIG. 6b of the accompanying drawings illustrates the top view of the sensor assembly with a bifurcated fin shown in FIG. 6a;

FIG. 7a of the accompanying drawings illustrates the side view of the sensor assembly showing rectangular sensing segments;

FIG. 7b of the accompanying drawings illustrates the top view of the sensor assembly showing rectangular sensing segments shown in FIG. 7a;

FIG. 8a of the accompanying drawings illustrates the side view of the sensor assembly showing disc shaped sensing segments;

FIG. 8b of the accompanying drawings illustrates the top view of the sensor assembly showing disc shaped sensing segments shown in FIG. 8a;

FIG. 9 of the accompanying drawings illustrates an embodiment of the flow meter in accordance with the invention which is easier for machining;

FIG. 10a of the accompanying drawings illustrates one embodiment of the sensor assembly employed in a noise free environment for the flow meters shown in FIGS. 1, 2 and 9;

FIG. 10b of the accompanying drawings illustrates one embodiment of the sensor assembly employed in a noisy environment for the flow meters shown in FIGS. 1, 2 and 9;

FIG. 11 of the accompanying drawings illustrates another embodiment of the sensor assembly employed in a noisy environment for the flow meters shown in FIGS. 1, 2 and 9;

FIG. 12 of the accompanying drawings illustrates one more embodiment of the sensor assembly employed in a noisy environment for the flow meters shown in FIGS. 1, 2 and 9;

FIG. 13 of the accompanying drawings illustrates a plot of the fluid oscillation frequency with respect to the fluid flow rate for an air flow; and FIG. 14 of the accompanying drawings illustrates a plot of the fluid oscillation frequency with respect to the fluid flow rate for a water flow.

DETAILED DESCRIPTION OF THE ACCOMPANYING DRAWINGS

The drawings and the description thereto are merely illustrative of a flow meter in accordance with this invention and only exemplify the flow meter of the invention and in no way limit the scope thereof.

In accordance with this invention there is provided a flow meter based on the Coanda effect. The Coanda Effect is the tendency of a fluid jet to stay attached to an adjacent curved surface that is very well shaped. In accordance with the Coanda effect, when a fluid stream flows from an inlet towards a bluff body, the stream attaches itself to one of the sidewalls.

In accordance with the preferred embodiment of the present invention, there is provided a feedback type, hydrodynamic oscillator flow meter for measuring the flow of fluids such as gas, air, water and oil, flowing through a conduit. The flow meter comprises a meter body having a passage for the flow of the fluid, said passage defining an inlet and an outlet, a nozzle provided in the passage spaced apart from the inlet, optionally at least one flow conditioner provided between the inlet of the passage and the inlet of the nozzle, a bluff body placed in the passage spaced apart from the outlet of the nozzle, at least one sensor assembly comprising a sensor body having at least two sensing segments, leads extending from the sensing segments to a metering device located outside the meter body and at least one sensor fin extending from the segments into the passage; and two feedback paths provided in the body, each of the feedback paths having a feedback inlet in the passage between the bluff body and the outlet of the passage and a feedback outlet located between the outlet of the nozzle and the bluff body, to permit feedback flow of the fluid, alternately through either of the feedback paths.

FIG. 1 of the accompanying drawings illustrates a flow meter in accordance with the present invention. The flow meter has a meter body 100 having a passage 125. The meter body 100 may be formed by joining together two components by bolting or molding together as a single body. These components are not shown in the FIG. 1, but can easily be understood by one skilled in the art. These components may be made of materials including stainless steel, other metals, synthetic materials, polymers or any combination of the above-mentioned materials.

The passage 125 defines an inlet 114 and an outlet 130. A nozzle 107 is provided in the passage 125 spaced apart from the inlet 114. A flow conditioner 113 is provided between the inlet 114 of the passage 125 and the inlet of the nozzle 107. The flow conditioner 113 can have a flow diverging element 124. When the flow diverging element 124 is positioned, the incoming stream of the fluid is diverted into two.

The flow conditioner 113 is provided with a machined rough surface, with uniform machined irregularities or is molded with irregularities. The irregularities provided to the flow conditioner 113 are in the form vertical notches or in the form of dimpled golf ball patterns. The flow conditioner has 4 surfaces viz., surface 108, surface 112, surface 118 and surface 122 forming two channels viz., channel 110 and channel 120.

The irregularities on all the surfaces 108, 112, 118, 122 and the remaining sides and surfaces of the flow diverging element 124 break the boundary layer of the flowing fluid attached to the walls and form vortices or turbulent regions so that the fluid does not stagnate and does not alter the flow profile and effective nozzle width at different flow rates. The two channels 110 and 120 also introduce certain amount of uncertainty in the combined flow which is passed on towards the nozzle 107. This helps the jet which will be formed after leaving the nozzle 107 to get deflected easily.

A bluff body 104 is placed in the passage 125 spaced apart from the outlet of the nozzle 107. Two feedback paths are provided in the body 100, represented by reference numerals 103 and 129, each of said feedback paths having a feedback inlet in the passage 125 between the bluff body 104 and the outlet 130 and a feedback outlet in the passage 125 located between the outlet of the nozzle 107 and the bluff body 104 to permit the feedback flow of the fluid, alternately through either of the feedback paths 103 and 129 in accordance with the Coanda Effect. When the fluid jet coming out of the nozzle 107 hits the bluff body 104, the fluid stream is diverted initially towards one of the alternate upstream paths towards the outlet 130 of the passage 125 from either side of the bluff body. In the course of the fluid flow through this selected path, a portion of the fluid enters the feedback path 103 or 129 which has its inlet in the selected path. This feedback flow, after emerging out from the feedback path outlet, strikes the fluid jet coming from the nozzle 107 and causes the fluid flow to be diverted into the other upstream path. Thereafter, the cyclical alternate diversion through the two feedback paths 103 and 129 continues.

At least one sensor fin, 105, 106, 126, 127 or 128, is provided in the passage 125. The sensor fin provided in the line of the flow of the fluid entering the meter body 100 through the inlet 114 through the flow conditioner 113 is a bifurcated sensor fin 126. The bifurcated sensor fin 126 defines the nozzle 107. Cylindrical fin sensors 106 can be placed in the feedback paths 103 and 129. Single fin sensors can also be provided along the side of the feedback paths 103 and 129 as shown in FIG. 1 by reference numerals 105 and 127 and between the partitions 102 as represented by the reference numeral 128. The sensor fins are part of sensor assemblies. In addition to the sensor fins, a sensor assembly has at least two sensing segments and leads extending from the sensing segments to a metering device located outside the meter body 100. The working of the sensor fin and sensor assembly is described in detail with respect to FIGS. 5a, 5b, 6a, 6b, 7a, 7b, 8a and 8b.

FIG. 2 of the accompanying drawings illustrates a flow meter in accordance with another embodiment of this invention, represented by a reference numeral 200. This flow meter employs a flow conditioner 202 without a flow diverging element. Here, the flow conditioning is achieved by the irregularities provided at surfaces represented by reference numerals 204 and 206.

Figures 3A, 3B, 3C, 3D:
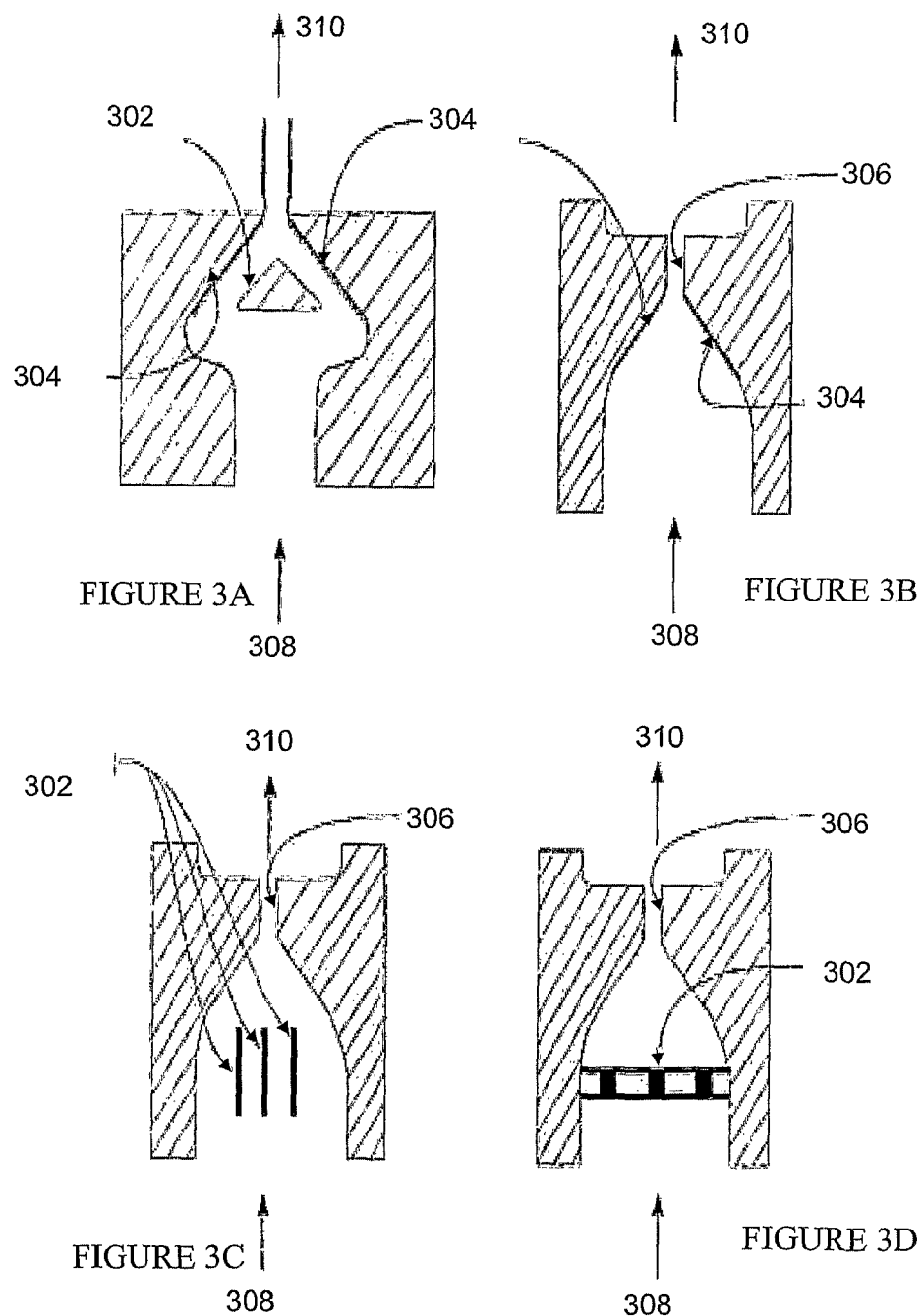

FIG. 3a-3d of the accompanying drawings illustrate different embodiments of the flow conditioner according to the present invention. FIG. 3a illustrates a flow conditioner with a triangular flow diverging element shown by a reference numeral 302 defining 4 surfaces and two channels. The inlet is represented by a reference numeral 308. The irregular surfaces are shown by the reference numeral 304 and the outlet by the reference numeral 310. FIG. 3b of the accompanying drawings illustrates another embodiment of the flow conditioner without a flow diverging element. The nozzle is represented by the reference numeral 306. FIG. 3c shows straightening vanes as the flow diverging element 302. A set of straightening vanes installed in the flow conditioner reduces disturbance before irregular flow reaches the nozzle, thereby smoothening the flow, creating a consistent flow profile, thus increasing the meter accuracy. FIG. 3d shows a perforated plate as the flow diverging element 302. The perforations (holes) in the plate cause the fluid flow to be reconfigured or readjusted in the radial directions so as to develop a preferred fluid flow profile.

FIG. 4a-4f of the accompanying drawings illustrate different embodiments of the bluff body in accordance with this invention. The selection of different shapes and sizes for the bluff body depends on the repeatable frequency of the fluid oscillations. Also, there is a requirement for a clean noise free signal irrespective of the different fluid types passing through the meter.

FIG. 5a of the accompanying drawings illustrates the side view of a sensor assembly with a single fin. FIG. 5b illustrates the top view of the sensor assembly shown in FIG. 5a. FIG. 6a of the accompanying drawings illustrates the side view of a sensor assembly with a bifurcated fin. FIG. 6b illustrates the top view of the sensor assembly shown in FIG. 6a. The single fin 506 of the sensor assembly in FIGS. 5a and 5b can be of rectangular shape or of cylindrical shape. Cylindrical fins are employed where there is a requirement for the least resistance caused by the fins to the fluid flow. Rectangular fins are employed where the flow is parallel to the fin, but the force applied by the flow in the direction perpendicular to the flow is to be measured. FIGS. 6a and 6b shows a bifurcated fin 606. The bifurcated fin is employed to create a nozzle in the meter body for forming a jet of the flowing fluid. 502 of FIGS. 5a and 5b, 602 of FIGS. 6a and 6b represent the wire leads coming out of the sensing segments, 504 of FIGS. 5a and 5b, 604 of FIGS. 6a and 6b represent the sensing segments and 508 of FIG. 5b and 608 of FIG. 6b represent the partition.

The sensor assembly with bifurcated fin/single fin/cylindrical fin/tapered fin can be formed, molded or cast in one of the body components or in such a way that one sensor is formed, molded or cast in one body component and the other sensor is similarly formed, molded or cast in the other body component. This method of locating/positioning the sensor assembly may be preferred when space is a restrictive criterion.

The sensing segments are selected from a group of sensing segments including piezoelectric sensing segments, piezoresistive sensing segments, capacitive sensing segments, optoelectric sensing segments, stress/strain responsive sensing segments, magnetostrictive sensing segments and pressure sensitive sensing segments.

Typically the sensing segments employed in the present invention are piezoelectric sensing segments.

When the force of the oscillating fluid causes the fins to deflect, the displacement of the fins is transferred to the sensing segments as a result of which opposite charges are induced in the sensing segments. Alternate flow of fluid through the feedback paths deflects the sensor fins differently. These deflections are sensed by the sensing segments which are alternately elongated or shortened causing electrical signals to be generated. These electrical signals are picked up by the leads outside the flow meter to a calibrated metering device, typically a differential amplifier employed in an electronic circuit. By sensing these electrical signals, even very low frequencies can be measured. Thus the measuring range is extended from very low to very high frequency.

The signal frequency corresponds to the fluid oscillation frequency which is proportional to the volume flow of the flowing fluid. The output amplitude of the sensor signal is also proportional to the amplitude of the fluid oscillation signal which is again proportional to the velocity and mass flow rate. Hence, by computing the frequency and amplitude of the output sensor signal, the corresponding mass flow rate is obtained.

FIGS. 7a, 7b, 8a and 8b illustrates the embodiments with multiple sensing segments. FIGS. 7a and 7b shows the implementation of four rectangular strip shaped sensing segments 704. The multiple sensing segments are employed to detect very low frequencies of oscillating fluid flow signals. The outer sensing segments can be connected to varying electrical voltage signal and thus, the sensor fins can be vibrated at a predetermined frequency. The oscillating fluid flow acting on the fin generates an electrical signal which modulates the electrical signal which made the fin to vibrate at the abovementioned predetermined frequency. This modulated frequency signal is now available as output from the inner sensing segments. This signal is further picked up by the leads to the calibrated metering device employed in the electronic circuit and thus, a very low frequency of the oscillating fluid flow can be measured accurately. FIGS. 8a and 8b shows the implementation of four disc shaped sensing segments 804. The wire leads are represented by a reference numeral 702 in FIGS. 7a and 7b and by a reference numeral 802 in FIGS. 8a and 8b. Similarly, fins are represented by a reference numeral 706 in FIG. 7a and by a reference numeral 806 in FIG. 8a.

FIG. 9 of the accompanying drawings illustrates an embodiment of a flow meter in accordance with the invention which is easier for machining. The meter body is represented by a reference numeral 900. The structure of the feedback paths 902 and 904 are circular which can be machined by a simple turning lathe. All the parts of this embodiment are geometrically simple in nature.

FIG. 10a illustrates the sensor assembly employed in a noise free environment. The sensing segments are represented by a reference numeral 1004, the wire leads coming out of the sensing segments are represented by a reference numeral 1002 and the fin is represented by a reference numeral 1006. FIG. 10b illustrates the sensor assembly employed in a noisy environment. The noise is cancelled by the introduction of a weight 1008. The weight 1008 compensates for the vibration of the fin 1006 caused by the external noise in the environment by vibrating in such a way so as to nullify the effect of vibration of the fin 1006. The placement and shape of the weight depend on the geometry and space and the method of casting or bonding of the sensor assembly.

FIGS. 11 and 12 are different embodiments of the sensor assembly with a weight. The reference numerals 1102 of FIG. 11 and 1202 of FIG. 12 represent the wire leads, 1104 of FIG. 11 and 1204 of FIG. 12 represent the sensing segments and 1106 of FIG. 11 and 1206 of FIG. 12 represent the fins. The weight is represented by reference numerals 1108 and 1208 respectively in FIG. 11 and FIG. 12.

FIG. 13 of the accompanying drawings illustrates a plot of fluid oscillation frequency with respect to the fluid flow rate for an air flow. The plot shows that a linear relationship is obtained between the fluid oscillation frequency and the fluid flow rate for the air flow. FIG. 14 of the accompanying drawings illustrates a plot of fluid oscillation frequency with respect to the fluid flow rate for a water flow. Again, for the water flow, a linear relationship is obtained between the fluid oscillation frequency and the fluid flow rate as shown in the plot. Typical measurement frequency range of the meters is 0 to 3000 Hz. Since the sensor is rigid without moving parts, high frequency signals in the range of 3000 Hz or more are also detected easily.

In accordance with one embodiment of the invention, two units can be arranged as a spirometer so as to measure the inhaled and the exhaled air flow rates of patients.

One or more piezoelectric sensing segments of circular or any shape can be fitted, molded inside, joined adhesively to the body components, or to the bottom face of the fins in the body components.

Advantages of Using Piezoelectric Sensors are as Follows:
1. Piezo electric sensors are very robust and they are not damaged by choking or by the tools used for cleaning.
2. Piezo electric sensors have wide operating temperature range viz., −20 degree C. to 300 degree C.
3. Piezo electric sensors have no limitation for operating pressure.
4. Piezo electric sensors have no limitation for material of construction for the flow meter.
5. Piezo electric sensors have no limitation for gas, liquid or steam or conductive/non conductive fluids. Flow rates of oils and emulsions of oil are easily measured.
6. Frequency (output) of piezo electric sensors is directly proportional to the volumetric flow rate irrespective of the fluid parameters.
7. Magnetic materials and burr can pass through the meter.
8. No choking or blocking of ports or passages of the meter takes place.
9. The piezo electric sensor can be molded in the body of the flow meter or can be fitted from outside into the body of the meter.
10. Various materials can be used to make a piezo electric sensor. So compatibility with corrosive fluids is not a problem.
11. External power is not required for the sensor.
12. It is possible in certain sizes of meter, to utilize the electric charge generated in the sensor for charging a small capacitor or a battery which can advantageously be used in battery powered meters.
13. Piezo electric sensors have very low cost compared to the magnet and the thermal sensors.
14. Piezo electric sensors have large signal to noise ratio.
15. Piezo electric sensors have smaller size and are easily available in various shapes and sizes.

TECHNICAL ADVANCEMENTS

The different technical advancements offered by the fluidic oscillator flow meter as envisaged in this invention are given below:

The flow meter measures flow rate of all types of fluids such as gas, oil, water and air and it is independent of the fluid properties.

The flow meter in accordance with this invention is very accurate over a long period of time since piezoelectric sensors are used.

The flow meter in accordance with this invention is economical and the total cost incurred can be reduced from 25% to 50%.

The flow meter in accordance with this invention is simple in construction.

The flow meter in accordance with this invention is very robust.

The invention claimed is:

1. A feedback type, hydrodynamic oscillator flow meter for measuring the flow of fluids such as gas, air, water and oil, flowing through a conduit, said flow meter comprising:
    a meter body having a passage for the flow of the fluid, said passage defining an inlet and an outlet;
    a nozzle provided in the passage spaced apart from said inlet;
    optionally at least one flow conditioner provided between the inlet of the passage and the inlet of the nozzle;
    a bluff body placed in the passage spaced apart from the outlet of the nozzle;
    at least one sensor assembly comprising a sensor body having at least two sensing segments, leads extending from said sensing segments to a metering device located outside said meter body and at least one sensor fin extending from said segments into said passage; and
    two feedback paths provided in the body, each of the feedback paths having a feedback inlet in the passage between the bluff body and the outlet of the passage and a feedback outlet located between the outlet of the nozzle and the bluff body, to permit feedback flow of the fluid, alternately through either of the feedback paths.

2. A flow meter as claimed in claim 1), wherein said sensing segments are selected from a group consisting of piezoelectric, piezoresistive, capacitive, optoelectric, strain/stress responsive, magnetoresistive and pressure sensitive sensing segments.

3. A flow meter as claimed in claim 1), wherein said sensing segments are round, disc shaped or in the form of rectangular strips.

4. A flow meter as claimed in claim 1), wherein said bluff body is a sensor fin.

5. A flow meter as claimed in claim 1), wherein said sensor fins are selected from a group consisting of single fins, bifurcated fins, cylindrical fins, rectangular fins, tapered fins and a combination thereof.

6. A flow meter as claimed in claim 1), wherein said sensor assembly has noise cancellation means.

7. A flow meter as claimed in claim 1), wherein said flow conditioner is provided with uniform machined irregularities.

8. A flow meter as claimed in claim 1), wherein said flow conditioner is molded with irregularities.

* * * * *

UNITED STATES PATENT AND TRADEMARK OFFICE
CERTIFICATE OF CORRECTION

PATENT NO. : 8,091,434 B2  Page 1 of 1
APPLICATION NO. : 12/997098
DATED : January 10, 2012
INVENTOR(S) : Avinash Shrikrishna Vaidya It is certified that error appears in the above-identified patent and that said Letters Patent is hereby corrected as shown below:

Col. 10, line 9, delete "in claim 1)" and insert -- in claim 1 --

Col. 10, line 14, delete "in claim 1)" and insert -- in claim 1 --

Col. 10, line 17, delete "in claim 1)" and insert -- in claim 1 --

Col. 10, line 19, delete "in claim 1)" and insert -- in claim 1 --

Col. 10, line 23, delete "in claim 1)" and insert -- in claim 1 --

Col. 10, line 25, delete "in claim 1)" and insert -- in claim 1 --

Col. 10, line 27, delete "in claim 1)" and insert -- in claim 1 --

Signed and Sealed this
Thirteenth Day of March, 2012

David J. Kappos
*Director of the United States Patent and Trademark Office*